United States Patent Office 3,700,479
Patented Oct. 24, 1972

3,700,479
METHOD OF PROVIDING A LUMINESCENT LAYER ON A SUPPORT
Johannes Wilhelmus Maria Arents, Emmasingel, Netherlands, assignor to U.S. Philips Corporation, New York, N.Y.
No Drawing. Filed Oct. 6, 1969, Ser. No. 864,223
Claims priority, application Netherlands, Oct. 7, 1968, 6814348
Int. Cl. H01j 1/62
U.S. Cl. 117—33.5 L      9 Claims

ABSTRACT OF THE DISCLOSURE

A suspension medium for a mixture of a fine-grained luminescent material and a fine-grained non-luminescent solid material containing a temporary binder, an organic non-polar non-aromatic liquid and an organic polar organic non-aromatic liquid, both liquids being solvents for the temporary binder.

---

The invention relates to a method of providing a luminescent layer on a support by establishing contact between the support and a suspension of the luminescent material. Furthermore, the invention relates to low-pressure mercury vapour discharge lamps which have a layer provided in such a manner on a support.

For many purposes, for example, in the manufacture of gas discharge lamps such as low-pressure and high-pressure mercury vapour discharge lamps it is desirable to coat a support, for example, a glass envelope with a satisfactorily adhesive layer formed from grains of luminescent material. The distribution according to grain size of the luminescent material is slightly dependent on the type of lamp, but it is substantially always chosen to be such that at least 95% of the amount by weight of the luminescent material has a grain size of between 6 and 40 microns.

It is not easy to provide such a fine luminescent material on a support because many requirements must be satisfied at the same time. One of the paramount requirements is of course that the adhesion to the support in the finished product must be quite satisfactory. Furthermore, the distribution of the grains in the luminescent layer must be very even in order to obtain a uniform light radiation throughout the surface of the support and a pleasant appearance of the finished product. Although it is possible, for example, by means of electrostatic coating, to provide the luminescent material in a dry state onto the support, it is more common practice to provide the material with the aid of a suspension of the luminescent material. In this method the suspension is brought into contact with the support to which a portion of the suspension adheres and the remainder of the suspension is removed. Such a method, is, for example, substantially always used when coating the envelopes of tubular low-pressure mercury vapour discharge lamps. This is effected, for example, by introducing a column of suspension liquid into the vertically arranged tubular envelope either by injection from the upper side or by causing the suspension to rise from the lower side. A layer of luminescent material is then deposited on the support while the superfluous suspension flows out of the tube. Subsequently the layer adhering to the envelope is dried at a temperature of 25–60° C. and is subsequently sintered, that is to say, heated for 90–240 seconds at a temperature of 400–600° C.

For methods employing a suspension, the suspension usually includes a binder, particularly nitrocellulose or ethyl cellulose. This binder has only a temporary task, namely for adhesion of the grains of luminescent material to the support as long as the layer has not been sintered yet. Subsequently, the binder is no longer necessary, since the adhesion may then be established in a different manner, namely by van der Waals's forces. The temporary binder may therefore disappear during sintering. Particularly when nitrocellulose or ethyl cellulose is used, the binder disappears during sintering without leaving substantially any traces.

The temporary binder must be soluble in the suspension medium so as to distribute itself satisfactorily over the luminescent grains and to render a regular coating of the support possible. Such a solvent is, for example, butyl acetate or xylene. When drying the suspension adhered to the support, the solvent evaporates and the luminescent grains adhere to the support due to the binder.

Although, as already stated above, the ultimate adhesion of the luminescent material to the support, for example, the glass envelope of a discharge tube, may be established exclusively by van der Waal's forces, thus without a binder, it is known that the adhesion, especially of coarser powders, can considerably be enhanced by using permanent binders which establish or enhance the binding of the luminescent material to the support in the ultimate finished product and cause the luminescent grains to adhere together. For example, very fine-grained aluminum oxide has been proposed as a permanent binder, that is to say, aluminum oxide having a grain size of approximately 0.02 micron. The amount of aluminum oxide is preferably from 0.1 to 1.0% by weight calculated on the amount of luminescent material.

The aluminum oxide must be mixed very intimately with the luminescent material and it must be provided on the support preferably simultaneously therewith. For this reason the aluminum oxide in the known method has also been introduced into the suspension. Thus, it must be possible to disperse two solid substances of a very different nature and grain size in the suspension. In addition, it must also be possible for a temporary binder to be dissolved in the suspension, since the aluminum oxide cannot take over the task of the temporary binder. To perform all these functions satisfactorily, it was found to be necessary to work with a suspension medium comprising more than one component. Therefore, a mixture of xylene and butanol containing ethyl cellulose as a temporary binder was used as a suspension medium. The principal task of the butanol is to ensure that the luminescent powder is deposited as a smooth coating on the support; the xylene mainly serves as a solvent for the ethyl cellulose.

The above described known method has the great drawback that the xylene, which is an aromatic organic compound, is very toxic and extremely inflammable. As a result special provisions to protect the workers are required for bulk manufacture which of course involves high costs.

If ethyl cellulose is replaced by nitrocellulose in the above described known method, then there is not only the drawback of the use of xylene, but also a great drawback for the finished product itself, namely the formation of an irregular cloud-like coating of the support.

It is an object of the invention to meet the above-mentioned drawbacks and to obtain possible other advantages.

According to the invention a method of providing a layer consisting of a mixture of a fine-grained luminescent material and a very fine-grained non-luminescent solid substance on a support with the aid of a suspension of these solid substances in a medium comprising at least two components, which also contains a temporary binder, which suspension is brought into contact with the support such that a layer of suspension adheres thereto, and subsequently the non-adhered remainder of the suspension is removed and the suspension coating adhered to the support is dried and subsequently sintered, is characterized in that the suspension liquid comprises at least 50 volume percent and at most 98 volume percent of a non-polar organic non-aromatic liquid, and comprises at least 2 and at most 50 volume percent of a non-aromatic liquid having a polar character due to the presence of at least one hydroxyl group, which liquids are both solvents for the temporary binder.

Since an organic non-aromatic liquid, for example, butyl acetate instead of, for example, xylene is used as a non-polar component in the suspension medium for a method according to the invention, the difficulties already stated above as regards toxicity and inflammability are obviated.

Due to the use of a polar non-aromatic liquid in which the temporary binder is soluble, very regular and highly adhesive smooth luminescent layers are obtained, even when using nitrocellulose. It is true that butanol used according to the above described known method is a liquid which has a polar character due to the presence of a hydroxyl group, but it is no solvent for nitrocellulose. Extensive investigations have shown that the irregular cloud-like coating when using nitrocellulose and butanol results from the insolubility of the nitrocellulose in the butanol for the xylene evaporates more quickly than the butanol when drying the suspension layer adhered to the support. As a result the layer becomes comparatively richer in butanol during drying and the nitrocellulose, which is insoluble therein, flocculates at a given instant.

A substance which is an ether is preferably chosen as a polar liquid. Very satisfactory results have been obtained with glycol monomethyl ether; other suitable substances are esters of lactic acid or hydroxy acetic acid, for example, methyl esters thereof.

In a method according to the invention, for example, aluminum oxide, magnesium oxide, titanium dioxide, magnesium pyrophosphate, calcium pyrophosphate or barium pyrophosphate may be used as non-luminescent solid substances. Aluminum oxide generally gives a smaller decline in luminous efficiency than do the other substances. Preferably the grain size of these substances is smaller than 1 micron and the distribution according to grain size is such that at least half of the substance has a grain size which is smaller than 0.15 micron.

A suspension is preferably used in which the suspension medium consists of 80 to 98 volume percent of non-polar liquid and 20 to 2 volume percent of polar liquid, both calculated as percentages of the liquid phase. In this suspension 0.7 to 2.5% by weight of nitrocellulose is dissolved and 0.2 to 1% by weight of aluminum oxide is dispersed. The percentages of nitrocellulose and aluminum oxide are calculated relative to the amount of luminescent substance to be suspended. Very satisfactorily adhesive, smooth and regular luminescent layers of the most widely divergent luminescent substances such as, for example, alkaline earth halophosphates germanates and arsenates are obtained with such a suspension. From 500 to 1500 g. of luminescent powder may be dispersed per litre of suspension medium.

After sintering the luminescent layer and the very fine-grained material contained therein, the supports, for example, a glass tube for the envelope of a low-pressure mercury vapour discharge lamp, may be processed in conventional manner to the ultimate product.

The invention will further be described with reference to two examples of compositions of suspension intended for coating a low-pressure mercury vapour discharge lamp.

EXAMPLE 1

45 g. of $Al_2O_3$
45 kg. of luminescent calcium halophosphate
15 litres of butyl acetate
1 litre of glycol monomethyl ether
1.5 litres of nitrocellulose solution (obtained by dissolving 2 kg. of nitrocellulose in a mixture of 95 litres of butyl acetate and 5 litres of glycol monomethyl ether)

were introduced in a vessel.

The mixture in the vessel was subsequently stirred for 2 minutes at a speed of 900 revolutions per minute; then it was stirred for 2 minutes at a speed of 2000 revolutions per minute. Subsequently 21 litres of the same nitrocellulose solution as described above were added while stirring at a speed of 900 revolutions per minute and further stirring took place for 2 to 5 minutes.

If desired, 3 litres of ethyl lactate may subsequently be added to the suspension obtained. Under circumstances this addition provides a still smoother coating in the manufacture of a lamp, as will further be described hereinafter.

EXAMPLE 2

45 g. of $Al_2O_3$
45 kg. of luminescent calcium halophosphate
15 litres of butyl acetate
1 litre of glycol monomethyl ether
1.5 litres of an ethyl cellulose solution (obtained by dissolving 5 kg. of ethyl cellulose in a mixture of 95 litres of butyl acetate and 5 litres of glycol monomethyl ether)

were introduced in a vessel.

The mixture in the vessel was subsequently stirred for 2 minutes at a speed of 900 revolutions per minute; then it was stirred for 2 minutes at a speed of 2000 revolutions per minute. Subsequently 25.5 litres of the same ethyl cellulose solution as described above, 10 litres of butyl acetate and 0.5 litre of glycol monomethyl ether were added while stirring at a speed of 900 revolutions per minute and further stirring took place for 2 to 5 minutes.

If desired, 3 litres of ethyl lactate may also be added to this suspension.

The suspension obtained in accordance with Example 1 or Example 2 may be used for the manufacture of a low-pressure mercury vapour discharge lamp in the manner as described in the preamble of this description. This method may be summarized as follows. A glass tube is taken and a column of a suspension prepared, in accordance with either of the two examples is introduced therein at a vertical position of the tube. The excess of suspension which has not adhered to the wall is allowed to drain off, the suspension coating adhered to the wall is dried, for example, by introducing hot air and the dried tube is introduced into a sintering furnace. The tube including the adhered coating on the wall is heated for 1.5 to 4 minutes at a temperature between 400° C. and 600° C. in this sintering furnace. After this heat treatment the tube may be processed in conventional manner to form a low-pressure mercury vapour discharge lamp.

What is claimed is:

1. A method of providing a luminescent layer on a base said method comprising applying to said base a phosphor coating composition particularly adapted for adhering phosphor powder to a surface, said composition comprising a suspension of a fine grained luminescent material, a fine-grained solid inorganic non-luminescent material capable of permanently binding said luminescent material to a surface after being sintered, a temporary organic binder which is decomposable upon heating and as a suspension medium a mixture consisting of at least 50 and at most 98% by volume of a non-polar non-aromatic liquid and at least 2 and at most 50% by volume of a non-aromatic polar organic liquid containing at least one hydroxyl group, both of said liquids being solvents for said temporary binder, removing any of said composition not adhering to the base, drying and then sintering the resultant coated base.

2. The method of claim 1 wherein the non-polar non-aromatic liquid is butyl acetate.

3. The method of claim 2 wherein the non-aromatic polar organic liquid is an ether.

4. The method of claim 3 wherein the ether is glycol monomethyl ether.

5. The method of claim 2 wherein the non-aromatic polar organic liquid is the methyl ester of lactic acid or of hydroxy acetic acid.

6. The method of claim 2 wherein the temporary binder is nitrocellulose.

7. The method of claim 6 wherein the fine-grained solid inorganic non-luminescent substance is aluminum oxide.

8. The method of claim 7 wherein the aluminum oxide consists of grams having a diameter of less than 1 micron and having a distribution such that at least half the grains have a diameter of less than 0.15 micron.

9. The method of claim 8 wherein the suspension medium consists of 80–98% by volume of butyl acetate and 20 to 2% by volume of the non-aromatic polar organic liquid and 0.7 to 2.5% by weight of the nitrocellulose and 0.1 to 1% by weight of the aluminum oxide is present based on the weight of the luminescent material.

References Cited

UNITED STATES PATENTS

| | | | |
|---|---|---|---|
| 2,829,295 | 4/1958 | Gast et al. | 117—33.5 X |
| 2,905,572 | 9/1959 | Jones | 117—33.5 |
| 3,059,133 | 10/1962 | Wanmaker et al. | 117—33.5 X |
| 3,316,109 | 4/1967 | Rimbach | 117—33.5 X |

RALPH S. KENDALL, Primary Examiner

U.S. Cl. X.R.

117—46 CA; 252—301.3 R; 313—109